United States Patent [19]
Rebentisch et al.
[11] 4,278,228
[45] Jul. 14, 1981

[54] COLLAPSIBLE SUPPORT STRUCTURES

[75] Inventors: Hugo E. Rebentisch, Garden City; Thomas Tuday, Dearborn, both of Mich.

[73] Assignee: GTE Products Corporation, Stamford, Conn.

[21] Appl. No.: 148,886

[22] Filed: May 12, 1980

[51] Int. Cl.[3] .................... F16M 13/00
[52] U.S. Cl. .................... 248/548; 40/612
[58] Field of Search .................... 248/548, 165; 52/98; 403/2, 187, 362; 40/612; 256/13.1; 404/6

[56] References Cited

U.S. PATENT DOCUMENTS

| | | | |
|---|---|---|---|
| 79,141 | 6/1868 | McFarlin | 248/548 X |
| 1,335,302 | 3/1920 | Stout | 248/548 X |
| 2,309,041 | 1/1943 | Booker et al. | 52/98 X |
| 2,309,238 | 1/1943 | Corey | 403/99 |
| 3,602,065 | 8/1971 | Ratcliff | 403 X/ |
| 3,628,296 | 12/1971 | Henry | 52/98 |
| 4,183,695 | 1/1980 | Wilcox | 272/102 X |

*Primary Examiner*—J. Franklin Foss
*Attorney, Agent, or Firm*—William R. McClellan

[57] ABSTRACT

Support structures for highway signs and barricades include collapsible assemblies which cause the structure, upon impact by a vehicle, to rotate away from the impact without flying apart. The collapsible assemblies utilize a connector fixture to couple a first member to a second member. The connector fixture includes a pivot pin which provides an axis of rotation for the second member and shear pins which hold the second member in a fixed orientation until the application to the second member of an impact. The impact fractures one of the shear pins and the second member rotates about the pivot pin away from the impact. Single post and multiple post support structures are disclosed. A support structure having two vertical members collapses to a flattened position when struck from any direction. The vehicle passes over the flattened support structure. In an alternate embodiment, the support structure rotates upward upon impact and passes over the vehicle.

20 Claims, 12 Drawing Figures

COLLAPSIBLE SUPPORT STRUCTURES

BACKGROUND OF THE INVENTION

This invention relates to collapsible support structures which are utilized to support highway signs, barricades, flashing lights and the like and, more particularly, to support structures which collapse, without flying apart, when struck by a moving vehicle.

Indicating devices such as signs, barricades, and flashing lights are used on or adjacent to highways to indicate construction areas, to block lanes, to warn motorists of road hazards, etc. Support for these indicating devices is commonly provided by a rigidly constructed metal framework. When such an indicating device and its associated support are accidentally struck by a vehicle traveling along the highway, the indicating device and support, or parts thereof, can be propelled in various directions causing injury to the vehicle occupants, workmen and pedestrians in the area, and occupants of oncoming vehicles.

It is desired to provide a support structure for highway indicating devices which creates a minimal risk of injury when struck by a vehicle. It has been found that the risk of injury is reduced when the support structure collapses to a horizontal position upon impact by a vehicle, thus allowing the vehicle to pass over the support structure and the attached indicating device. Furthermore, the support structure must be configured to hold together after impact so that flying parts do not cause personal injury and must have sufficient strength to withstand rough handling by highway workers. U.S. Pat. No. 4,183,695, issued Jan. 15, 1980, to Wilcox discloses a barricade which collapses when struck from the front or rear. However, the disclosed barricade does not collapse when subjected to a sideways impact.

Another approach is to configure the support structure so that the attached indicating device passes over the top of the vehicle after impact. This configuration is particularly useful for signs which are taller than vehicles. Typically, the support structure detaches from its base near ground level upon impact.

SUMMARY OF THE INVENTION

According to the present invention, a support structure includes a first collapsible assembly and a second collapsible assembly, each including an elongated base member and an elongated support member connected to the base member by a support connector fixture. The support structure further includes an elongated cross member and first and second cross member connector fixtures which couple the ends of the cross member to the support members of the first and second spaced apart collapsible assemblies, respectively. The support connector fixtures each include a support connector frame coupled to the base member, a support pivot pin passing through the support member and secured to the support connector frame, and support shear pin means secured to the support connector frame and located adjacent the support member so as to hold the support member in a vertical orientation. The cross member connector fixtures each include a cross member connector frame coupled to the support member, a cross member pivot pin passing through the cross member and secured to the cross member connector frame, and cross member shear pin means secured to the cross member connector frame and located adjacent the cross member so as to hold the cross member perpendicular to the support member. The application to the support structure of a frontal impact sufficient to fracture the support shear pin means causes the support members to rotate about the support pivot pins away from the frontal impact to a horizontal position. The application to the support structure of a sideways impact sufficient to fracture the cross member shear pin means causes the cross member to rotate about the cross member pivot pins thereby causing the first and second collapsible assemblies to rotate about the base members to a horizontal position.

According to another aspect of the invention, a collapsible assembly includes a first member adapted for mounting thereon of a highway indicator, an elongated second member having a first end coupled to the first member by a connector fixture and coupling means, connected to a second end of the second member, for coupling the collapsible assembly to a base. The coupling means and the second member are easily detached from the base upon the application to the second member of a lateral impact. The connector fixture includes a connector frame coupled to the first member, a pivot pin passing through the second member and secured to the connector frame and shear pin means secured to the connector frame and located adjacent to the second member so as to prevent rotation of the second member about the pivot pin. The application to the second member of a lateral impact, sufficient to detach the second member from the base and fracture the pivot pin, causes the second member to rotate about the pivot pin away from the impact.

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
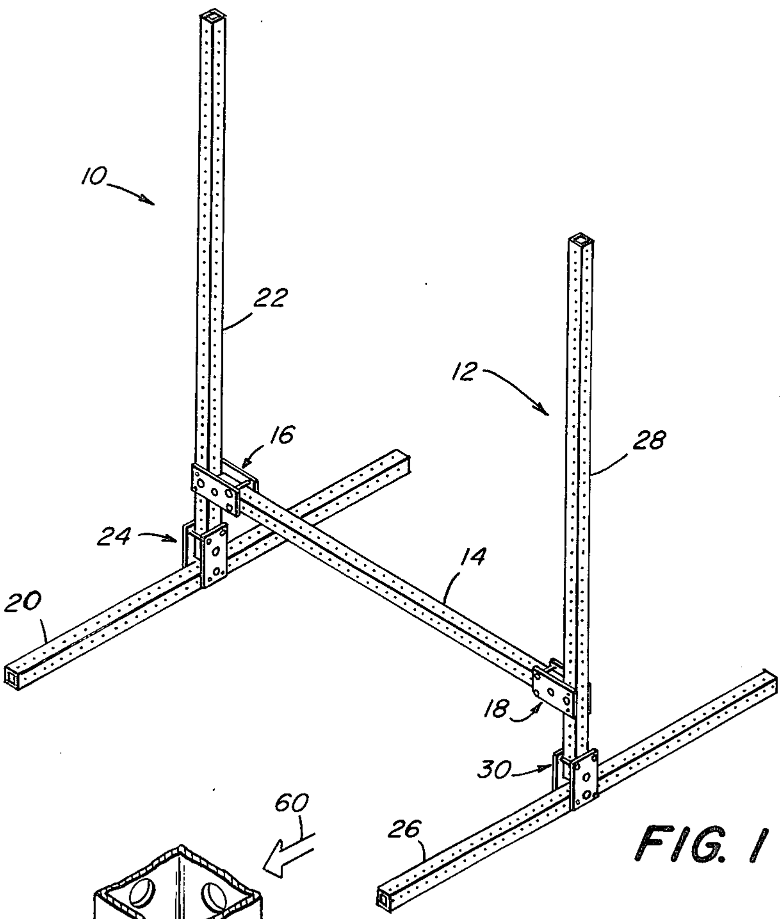
FIG. 1 is a perspective view of a support structure according to the present invention.

A support structure according to the present invention is shown in FIG. 1 and includes a first collapsible assembly 10, a second collapsible assembly 12, a cross member 14, and cross member connector fixtures 16 and 18. The first collapsible assembly 10 includes a base member 20, an elongated support member 22 coupled to the base member 20 by a support connector fixture 24. The second collapsible assembly 12 includes a base member 26, an elongated support member 28 coupled to the base member 26 by a base connector fixture 30. One end of the cross member 14 is coupled to the support member 22 by the cross member connector fixture 16. The other end of the cross member 14 is coupled to the support member 28 by the cross member connector fixture 18.

Figure 2:
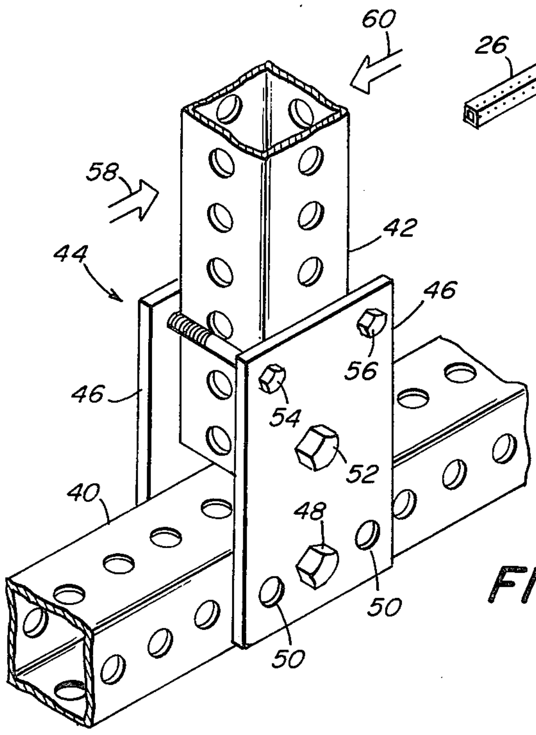
FIG. 2 is a perspective view of the collapsible assembly utilized in the support structure of FIG. 1.

Referring now to FIG. 2, there is shown a collapsible assembly according to the present invention which includes a first member 40 coupled to a second member 42 by a connector fixture 44. The connector fixture 44 in FIG. 2 is identical in structure and operation to the cross member connector fixtures 16 and 18 in FIG. 1 and the support connector fixtures 24 and 30 in FIG. 1. FIG. 2 thus shows the details of the connector fixtures 16, 18, 24, and 30 of FIG. 1. The connector fixture 44 includes a connector frame which typically includes a pair of flat connector plates 46 rigidly coupled to the first member 40 by a fastener element such as a bolt 48 passing through a hole in each connector plate 46. The connector plates 46 can include lugs 50 which mate with openings in the first member 40 and operate to position the connector plates 46 relative to the first member 40. Alternatively, the lugs 50 can be replaced by additional bolts. The connector fixture 44 also includes a pivot pin 52 which passes through a hole near one end of the second member 42 and through a hole in each connector plate 46. The pivot pin 52 is secured to the connector plates 46 on opposite sides of the second member 42. Adequate clearance is provided between the lower end of the second member 42 and the upper surface of the first member 40 to permit the second member 42 to rotate about the pivot pin 52. The connector fixture 44 further includes shear pins 54 and 56 secured to the connector plates 46 through holes in each connector plate 46 and located adjacent to the second member 42 so as to hold the second member 42 in a fixed orientation and prevent rotation of the second member 42 about the axis of rotation provided by the pivot pin 52. The pivot pin 52 has a higher shear strength than the shear pins 54 and 56.

The shear pins 54 and 56 maintain the second member 42 in a fixed orientation until the application to the second member 42 of a lateral impact having a component perpendicular to the axis of rotation provided by the pivot pin 52. Such an impact will fracture one of the shear pins 54 or 56 and cause the second member 42 to rotate about the pivot pin 52 away from the impact. For example, an impact of sufficient magnitude in the direction shown by the arrow 58 will cause the shear pin 56 to fracture and the second member 42 to rotate in a clockwise direction. Similarly, an impact of sufficient magnitude in the direction shown by the arrow 60 will cause the shear pin 54 to fracture and the second member 42 to rotate in a counterclockwise direction about the pivot pin 52. Clearly, the application to the first member 40 of a lateral impact having a component perpendicular to the axis of rotation provided by the pivot pin 52 is equivalent to an impact to the second member 42. Thus, an impact to the first member 40 will also fracture one of the shear pins 54 or 56.

An important feature of the present invention is that special shear pins are not required. The shear pins 54 and 56 can be common low carbon machine bolts as stocked and sold in hardware stores. Typically, a one-quarter inch diameter bolt is used for shear pins 54 and 56. The pivot pin 52 requires greater shear strength and can be a three-eighths inch diameter bolt.

The base members 20 and 26, the support members 22 and 28, and the cross member 14 of the support structure shown in FIG. 1 are typically tubular in configuration and have a plurality of openings spaced along the length of each of the members. These tubular members are typically square in cross-section, are made of steel and are commercially available from the Unistrut Corporation, Wayne, Michigan, under the trade name Telespar. The first and second collapsible assemblies 10 and 12 are spaced apart by the cross member 14 and are aligned so that the pivot pins of the support connector fixtures 24 and 30 are collinear. Also, the tubular base members 20 and 26 are parallel to each other and the tubular support members 22 and 28 are parallel to each other. Thus, the support members 22 and 28 define a plane of the support structure.

As noted hereinabove, the support connector fixtures 24 and 30 are identical to the connector fixture 44 shown in FIG. 2. Thus, the support members 22 and 28 are held in a vertical orientation by the shear pins and the pivot pins of the connector fixtures 24 and 30, respectively, and are provided with an axis of rotation by the pivot pins of the connector fixtures 24 and 30, respectively. Also as noted hereinabove, the cross member connector fixtures 16 and 18 are identical to the connector fixture 44 shown in FIG. 2. Thus, the cross member 14 is held in a horizontal orientation perpendicular to the support members 22 and 28 by the shear pins and the pivot pins of the connector fixtures 16 and 18 and is provided with axes of rotation by the respective pivot pins of the connector fixtures 16 and 18.

The support structure as shown in FIG. 1 with a sign, reflective barricade, or other indicator attached to support members 22 and 28 is placed on or beside a highway and oriented with the plane of the support structure roughly perpendicular to the direction of travel of vehicles on the highway. If desired, sandbags or other weights can be placed on the base members 20 and 26 to hold the assembly in position.

Figure 3:
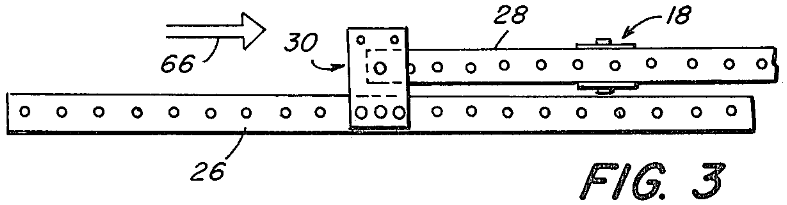
FIG. 3 is a side view of the support structure of FIG. 1 after being subjected to a frontal impact.

Referring now to FIG. 3, when the support structure is subjected by a vehicle to a frontal impact or, more precisely, to an impact in a direction perpendicular to the plane formed by support members 22 and 28, as indicated by the arrow 66, the respective shear pins of base connector fixtures 24 and 30 are fractured. Clearly, an impact from the front or rear has an equivalent effect. The upper portion of the structure, including support members 22 and 28, cross member 14, cross member connector fixtures 16 and 18, and any attached sign or indicator, rotates about the pivot pins of the support connector fixtures 24 and 30 to a horizontal position as shown in FIG. 3. The vehicle now passes over the flattened assembly. Furthermore, the support structure is held together, except for the fractured shear pins, by the pivot pins of the support connector fixtures 24 and 30, thus avoiding potential injury caused by flying parts of the support structure.

Figure 4:
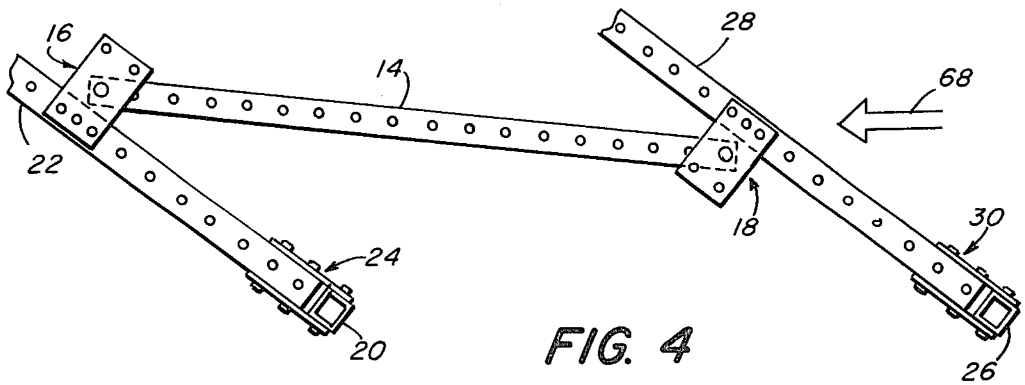
FIG. 4 is a frontal view of the support structure of FIG. 1 after being subjected to a sideways impact.

Referring now to FIG. 4, when the support structure is subjected by a vehicle to a sideways impact or, more precisely, to an impact in a direction parallel to the plane formed by the support members 22 and 28, as indicated by the arrow 68, the respective shear pins of the cross member connector fixtures 16 and 18 are fractured. When this occurs, the sideways impact of the vehicle causes the collapsible assemblies 10 and 12 to rotate about their respective base members 20 and 26 in a sideways direction. Simultaneously, the cross member 14 rotates about the pivot pins of the cross member connector fixtures 16 and 18. The net effect is that the entire support structure collapses in a sideways direction away from the direction of impact. Clearly, an impact from either side has an equivalent effect. After an impact, the pivot pins of the cross member connector fixtures 16 and 18 hold the assembly together, except for the fractured shear pins, and prevent flying parts from causing injury to persons in the area. It can be seen that the support structure disclosed herein collapses or is flattened by an impact from any direction. Either base connector fixtures 24 and 30 or cross member connector fixtures 16 and 18 have their shear pins fractured depending on the direction of impact of the vehicle. When the support structure is subjected to an impact at an oblique angle shear pins in all the connector fixtures 16, 18, 24, and 30 can be fractured.

Support structures as described hereinabove with reflective barricades attached thereto were tested by subjecting the support structure and attached barricade to impacts by a vehicle traveling at 55±5 mph. The support structure operated as hereinabove described and the tests were considered successful. The best results were achieved when the cross member 14 was located at a height of approximately 7 inches above the highway pavement.

Figure 5:
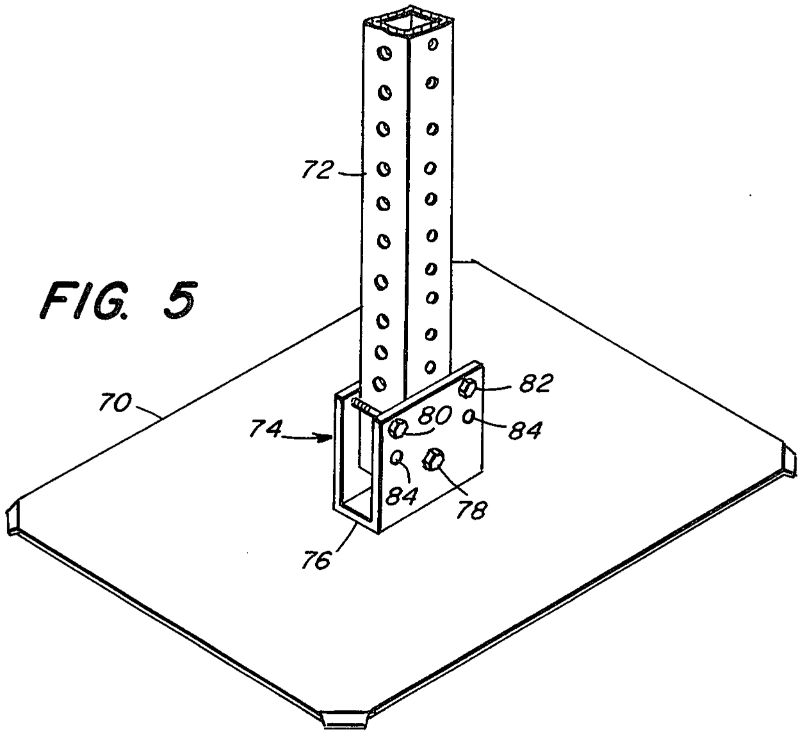
FIG. 5 is a perspective view of a single post collapsible assembly.

Another configuration of a collapsible assembly according to the present invention is shown in FIG. 5. The collapsible assembly of FIG. 5 provides single post support of highway signs or other indicators and includes a base member 70 and a support member 72 coupled to the base member 70 by a connector fixture 74. The connector fixture 74 is similar in construction and operation to the connector fixture 44 shown in FIG. 2 and includes a generally U-shaped connector frame 76. The base of the connector frame 76 is coupled to the base member 70 while the arms of connector frame 76 are located on opposite sides of the support member 72. A pivot pin 78 passes through a hole near the lower end of the support member 72 and is secured to the arms of connector frame 76, thus providing an axis of rotation for the support member 72. Shear pins 80 and 82 are secured to the arms of the connector frame 76 and are located adjacent to the support member 72 so as to hold the support member 72 in a vertical orientation and prevent it from rotating about the pivot pin 78 until the application to support member 72 of a lateral impact of sufficient magnitude to fracture one of the shear pins 80 and 82. The connector frame 76 further includes one or more holes 84 which receive pins or bolts which are utilized to hold the collapsible assembly in a collapsed position for storage.

Figure 6:
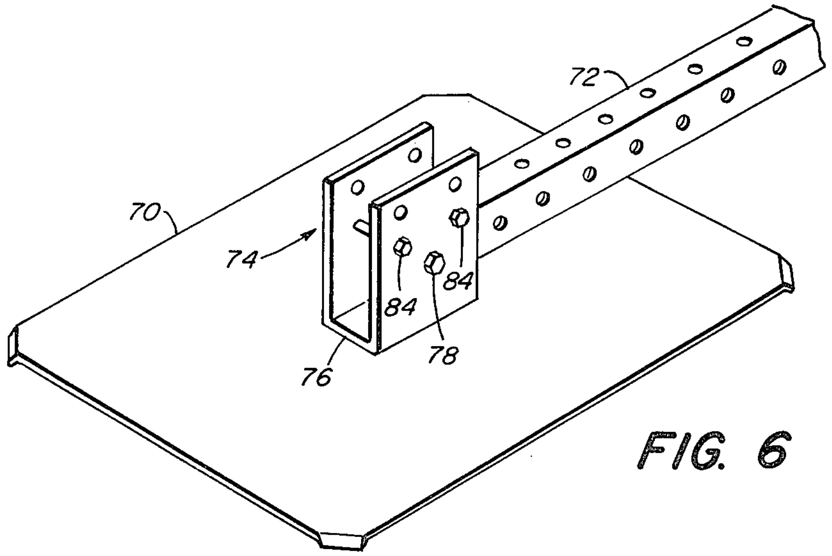
FIG. 6 is a perspective view of the collapsible assembly of FIG. 5 in the collapsed position.

Referring now to FIG. 6, there is shown the collapsible assembly of FIG. 5 in a collapsed position. The assembly collapses after an impact fractures one of the shear pins 80 or 82 as described hereinabove in connection with FIG. 2. Also, the collapsible assembly can be intentionally placed in the collapsed position for storage or transportation by removing one or both of the shear pins 80 and 82 and rotating the support member 72 to a horizontal position. The assembly can be secured in the collapsed position by inserting shear pins or other bolts in the holes 84 in connector frame 76. The collapsible assembly can be more easily stored in a flattened or collapsed position.

Figure 7:
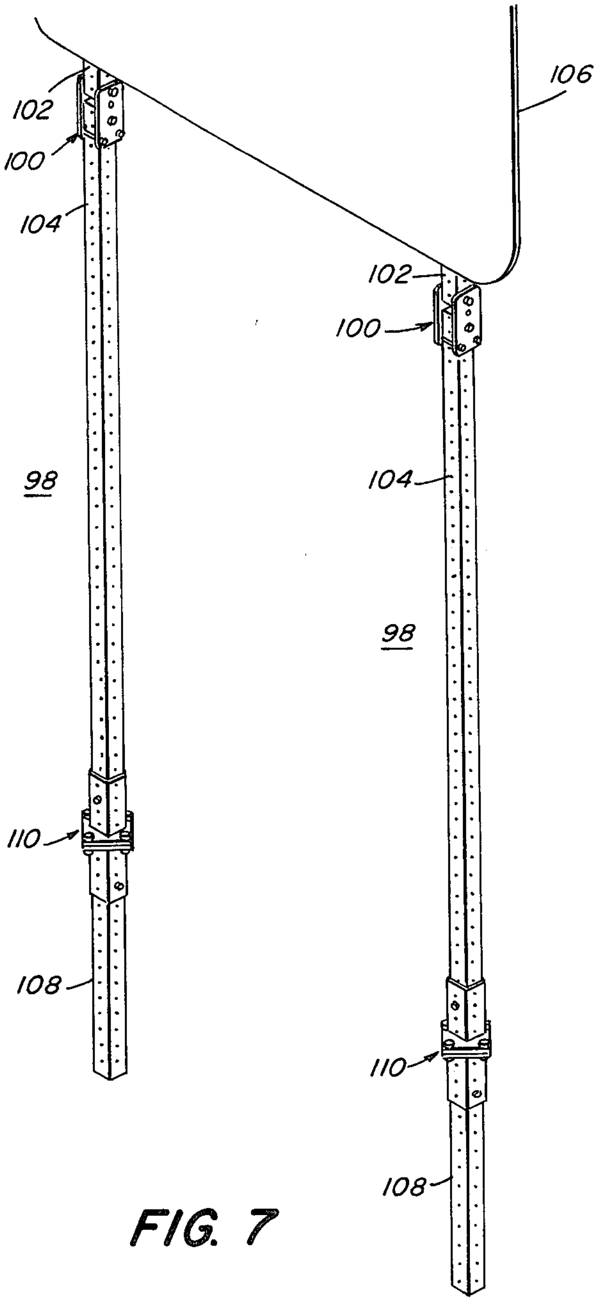
FIG. 7 is a perspective view of another support structure according to the present invention.

Referring now to FIG. 7, there is shown a support structure for signs or other indicators utilizing collapsible assemblies 98, each including a connector fixture 100 located at a relatively short distance below the sign. Each collapsible assembly 98 includes a first member 102 and a second member 104 in a collinear configuration. The second member 104 has one end coupled to the first member 102 by the connector fixture 100. A sign 106 is coupled to the first member 102. The collapsible assembly 98 is coupled at the other end of the second member 104 to a base 108 by a fitting 110 which is easily fractured upon application to the second member 104 of a lateral impact, thus detaching the collapsible assembly 98 from the base 108. Such fittings are known and may include a horizontal plate coupled to the second member 104 and a horizontal plate coupled to the base 108. The horizontal plates are coupled together by one or more bolts.

Figure 8:
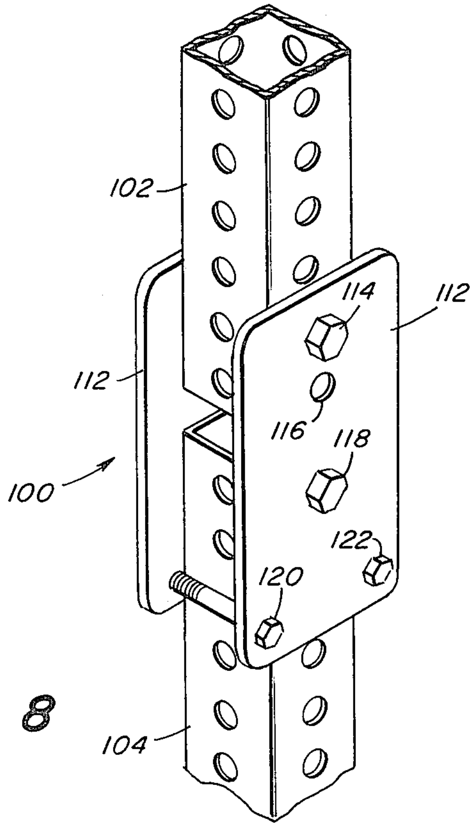
FIG. 8 is a perspective view of the collapsible assembly utilized in the support structure of FIG. 7.

The connector fixture 100, which is similar in construction and operation to the connector fixture 44 shown in FIG. 2, is shown in more detail in FIG. 8. The connector fixture 100 includes a connector frame which typically includes a pair of flat connector plates 112 rigidly coupled to the first member 102 by a bolt 114. A lug 116 mates with an opening in the first member 102 and operates to position the connector plates 112 relative to the first member 102. The connector fixture 100 also includes a pivot pin 118 which passes through a hole near the one end of the second member 104 and is secured to the connector plates 112 on opposite sides of the second member 104. Adequate clearance is provided between the ends of the first and second members 102 and 104 to permit the second member 104 to rotate about the pivot pin 118. The connector fixture 100 further includes shear pins 120 and 122 secured to the connector plates 112 and located adjacent to the second member 104 so as to hold the second member 104 in a fixed orientation and prevent rotation of the second member 104 about the pivot pin 118. The pivot pin 118 has a higher shear strength than the shear pins 120 and 122. The shear pins 120 and 122 can be common low carbon machine bolts.

Figure 9:
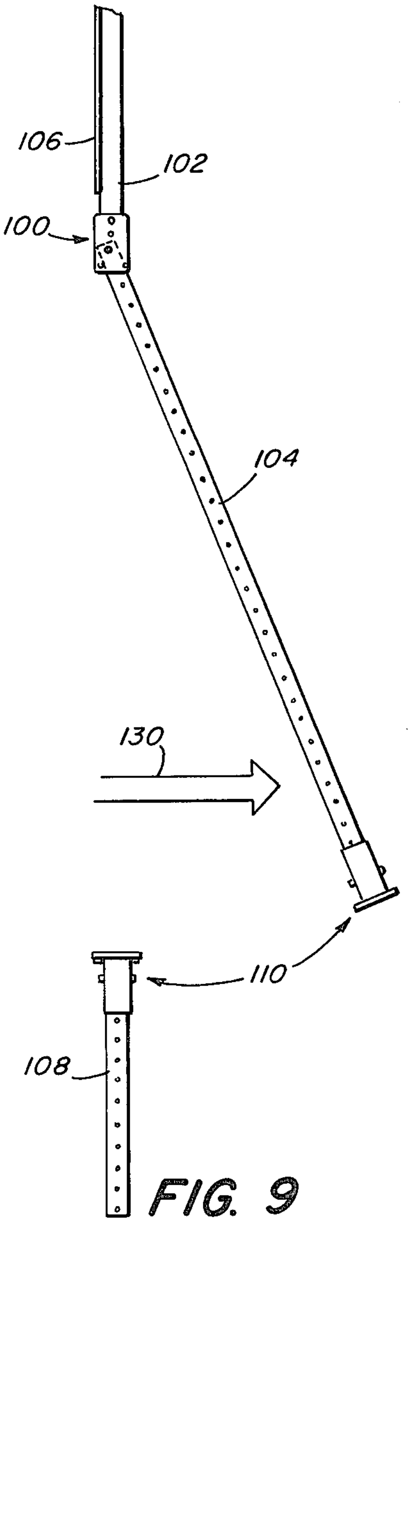
FIG. 9 is a side view of the support structure of FIG. 7 after being subjected to a lateral impact.

The operation, upon impact of each collapsible assembly 98 of FIG. 7, is shown in FIG. 9. The fitting 110 is fractured when an impact, as represented by the arrow 130 in FIG. 9, is applied to the lower part of the second member 104 and the lower end of the second member 104 moves away from the impact. Due to wind resistance and inertia, the sign 106 and the first member 102 move more slowly than the second member 104, thereby generating forces in the connector fixture 100 which fracture one of the shear pins 120 or 122. After the fracture of one of the shear pins 120 or 122, the second member 104 is free to rotate about the pivot pin 118 away from the impact. The support structure shown in FIGS. 7–9 functions in the same manner when struck from the rear, or in a direction opposite the arrow 130 in FIG. 9.

Figure 10:
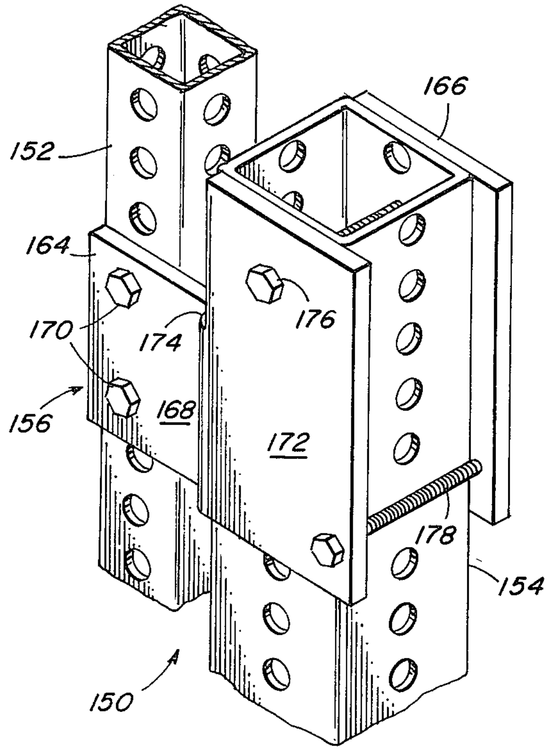
FIG. 10 is a perspective view of another collapsible assembly for the support of signs according to the present invention.
Figure 11:
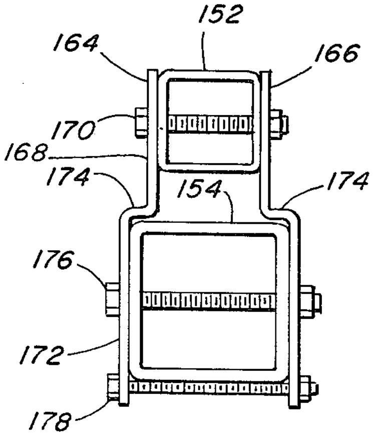
FIG. 11 is a top view of the collapsible assembly of FIG. 10.
Figure 12:
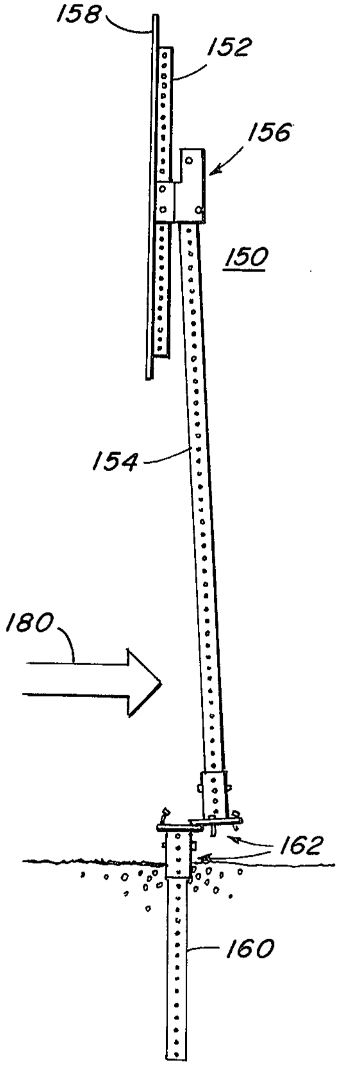
FIG. 12 is a side view of a support structure utilizing the collapsible assembly of FIG. 10 just after impact.

A support structure for signs or other highway indicators, which provides an alternative to the configuration shown in FIGS. 7–9, is illustrated in FIGS. 10–12.

FIGS. 10 and 11 are perspective and top views, respectively, which illustrate the details of a collapsible assembly 150 used to support a sign. The collapsible assembly 150 includes a first member 152 and a second member 154 coupled at one end of the second member 154 to the first member 152 by a connector fixture 156. As shown in FIG. 12, which illustrates a support assembly just after impact, a sign 158 is fastened to the first member 152. The connector fixture 156 is located at the approximate midpoint of the vertical dimension of the sign 158 and the first member 152. The collapsible assembly 150 is coupled at the other end of the second member 154 to a base 160 by a fitting 162 which is easily fractured upon the application to the second member 154 of a lateral impact. The fitting 162 corresponds to the fitting 110 shown in FIGS. 7 and 9 and described hereinabove. The first member 152 and the second member 154 in FIG. 10 are parallel whereas the first and second members 102 and 104 shown in FIGS. 7–9 are collinear.

Referring again to FIGS. 10 and 11, the connector fixture 156 includes a connector frame which typically includes a left connector plate 164 and a right connector plate 166, each having a first portion 168 rigidly coupled to the first member 152 by bolts 170. The connector plates 164 and 166 also include second portions 172 located on opposite sides, respectively, of the second member 154. In the example shown in FIGS. 10 and 11, the second member 154 has a larger cross-sectional area than the first member 152. Therefore, the first and second portions 168 and 172 of the connector plates 164 and 166 are in different planes and are interconnected by web portions 174. When the first and second members 152 and 154 are of equal dimension, the connector plates 164 and 166 are flat. The connector fixture 156 also includes a pivot pin 176 which passes through a hole near the one end of the second member 154 and is secured to the connector plates 164 and 166 on opposite sides of the second member 154. The connector fixture 156 further includes a shear pin 178 secured to the connector plates 164 and 166 and located adjacent to the second member 154 so as to hold the second member 154 in a fixed orientation. More specifically, the shear pin 178 prevents rotation of the second member 154 about the pivot pin 176 in a direction away from the first member 152. The web portions 174 of the connector plates 164 and 166 prevent rotation of the second member 154 about the pivot pin 176 in a direction toward the first member 152. The pivot pin 176 has a higher shear strength than the shear pin 178. The shear pin 178 can be a common low carbon machine bolt.

The operation upon impact of the collapsible assembly 156 of FIGS. 10 and 11 is shown in FIG. 12. The fitting 162 is fractured when an impact, as represented by the arrow 180 in FIG. 12, is applied to the lower part of the second member 154. The collapsible assembly 156 is detached from the base 160 and the lower end of the second member 154 moves away from the impact. Due to wind resistance and inertia, the sign 158 and the first member 152 move more slowly than the second member 154, thereby generating forces in the connector fixture 156 which fracture the shear pin 178. After the shear pin 178 is fractured, the second member 154 is free to rotate about the pivot pin 176 away from the impact.

Since normal wind forces are evenly distributed over the face of the sign 158 and the connector fixture 156 is centrally located, the shear pin 178 is not appreciably stressed by wind. However, the support assembly collapses only when struck from the front, or in the direction of the arrow 180 in FIG. 12.

The sign support structures described hereinabove and shown in FIGS. 7–12 can include one or more collapsible assemblies 98 or 156. When all of the collapsible assemblies supporting a sign are struck by a vehicle, each collapsible assembly functions as shown in FIG. 9 or FIG. 12 and above-described, and the sign and support structure pass harmlessly over the top of the vehicle. Furthermore, the pivot pin of each connector fixture holds the entire assembly together, except for the fractured shear pins, thus avoiding the above-referenced problem of flying parts. When less than all of the collapsible assemblies supporting the sign are struck by a vehicle, the second members which were struck rotate away from the impact as shown in FIG. 9 and FIG. 12 and pass over the top of the vehicle. The remaining collapsible assemblies which were not struck by the vehicle continue to hold the sign in position and the vehicle passes under the sign.

While there has been shown and described what is at present considered the preferred embodiments of the invention, it will be obvious to those skilled in the art that various changes and modification may be made therein without departing from the scope of the invention as defined by the appended claims.

What is claimed is:

1. A support structure comprising:

a first collapsible assembly and a second collapsible assembly, each comprising
- an elongated base member,
- an elongated support member having a hole therethrough proximate one end, and
- a support connector fixture for connecting said support member to said base member, said support connector fixture including
  - a support connector frame coupled to said base member and including portions on opposite sides of said support member,
  - a support pivot pin passing through said hole in said support member and secured to said support connector frame portions on opposite sides of said support member, and
  - support shear pin means secured to said support connector frame and located adjacent said support member so as to hold said support member in a vertical orientation and prevent rotation of said support member about said support pivot pin in either direction, said first and second collapsible assemblies being spaced apart and aligned so that the base members of said first and second collapsible assemblies are substantially parallel;

an elongated cross member having a hole therethrough proximate each end; and first and second cross member connector fixtures for coupling the ends of said cross member to said support members of said first and second collapsible assemblies, respectively, each of said cross member connector fixtures comprising
- a cross member connector frame coupled to said support member and including portions on opposite sides of said cross member,
- a cross member pivot pin passing through said hole in said cross member and secured to said cross member connector frame portions on opposite sides of said cross member, and cross member shear pin means secured to said cross member connector frame and located adjacent said cross member so as to hold said cross member substantially perpendicular to said support members and to prevent rotation of said cross member about the cross member pivot pins in either direction, whereby the application to said support members of an impact having a component perpendicular to a plane defined by said first and second support members, sufficient to fracture said support shear pin means, causes said support members to rotate about said support pivot pins away from said impact to a horizontal position, and whereby the application to said support members of an impact having a component parallel to the plane defined by said first and second support members, sufficient to fracture said cross member shear pin means, causes said cross member to rotate about said cross member pivot pins thereby causing said first and second collapsible assemblies to rotate about said base members to a horizontal position.

2. The support structure as defined in claim 1 wherein the base members and the support members of said first and second collapsible assemblies and said cross member each have a tubular configuration with a plurality of openings spaced along the respective members.

3. The support structure as defined in claim 2 wherein said support connector frame includes a pair of substantially flat support connector plates on opposite sides of said support member, said support connector plates having holes therethrough for receiving said support pivot pin and said support shear pin means.

4. The support structure as defined in claim 3 wherein said support shear pin means includes a pair of pins parallel to said support pivot pin.

5. The support structure as defined in claim 4 wherein said cross member connector frame includes a pair of substantially flat cross member connector plates on opposite sides of said cross member, said cross member connector plates having holes therethrough for receiving said cross member pivot pin and said cross member shear pin means.

6. The support structure as defined in claim 5 wherein said cross member shear pin means includes a pair of pins parallel to said cross member pivot pin.

7. The support structure as defined in claim 6 wherein said cross member is coupled to said support members less than twelve inches above said base members.

8. The support structure as defined in claim 7 wherein said support member shear pin means and said cross member shear pin means includes low carbon machine bolts.

9. The support structure as defined in claim 8 wherein each of said support connector frames includes at least one additional hole therethrough for receiving a fastener element, said additional hole being located on said support connector frame such that said fastener element, when inserted therethrough, holds said support member in a generally flattened configuration to facilitate storage.

10. A collapsible assembly comprising:

a first member adapted for mounting thereon of a highway indicator:

an elongated second member having a hole therethrough proximate a first end;

a connector fixture for connecting said second member to said first member, said connector fixture including a connector frame coupled to said first member and including portions on opposite sides of said second member, a pivot pin passing through the hole in said second member and secured to said connector frame portions on opposite sides of said second member, and shear pin means secured to said connector frame and located adjacent said second member so as to prevent rotation of said second member about said pivot pin; and coupling means, connected to a second end of said second member, for coupling said collapsible assembly to a base, said coupling means and said second member being easily detached from said base upon the application to said second member of a lateral impact, whereby the application to said second member of a lateral impact, sufficient to detach said second member from the base and fracture said pivot pin, causes the second member to rotate about said pivot pin away from said impact, said lateral impact having a component perpendicular to said pivot pin.

11. The collapsible assembly as defined in claim 10 wherein said first and second members each have a tubular configuration with a plurality of openings spaced along their respective lengths.

12. The collapsible assembly as defined in claim 11 wherein said first and second members have a generally collinear configuration.

13. The collapsible assembly as defined in claim 12 wherein said connector frame includes a pair of substantially flat connector plates on opposite sides of said second member, said plates having holes therethrough for receiving said pivot pin and said shear pin means.

14. The collapsible assembly as defined in claim 13 wherein said shear pin means includes a pair of pins parallel to said pivot pin.

15. The collapsible assembly as defined in claim 14 wherein said shear pin means includes low carbon machine bolts.

16. The collapsible assembly as defined in claim 11 wherein said first and second members have a generally parallel configuration.

17. The collapsible assembly as defined in claim 16 wherein said connector frame is coupled to said first member near the midpoint of said first member.

18. The collapsible assembly as defined in claim 17 wherein said connector frame includes a pair of connector plates on opposite sides of said second member, said plates having holes therethrough for receiving said pivot pin and said shear pin means.

19. The collapsible assembly as defined in claim 18 wherein said shear pin means includes a pin parallel to said pivot pin.

20. The collapsible assembly as defined in claim 19 wherein said shear pin means includes a low carbon machine bolt.

* * * * *